United States Patent [19]

Tanaka

[11] Patent Number: 5,150,265
[45] Date of Patent: Sep. 22, 1992

[54] TAPE TENSIONING DEVICE FOR TAPE RECORDER

[75] Inventor: Shinsaku Tanaka, Tokyo, Japan

[73] Assignee: Tanashin Denki Co., Ltd., Tokyo, Japan

[21] Appl. No.: 565,459

[22] Filed: Aug. 10, 1990

[30] Foreign Application Priority Data

Jan. 31, 1990 [JP] Japan .................................. 2-21201

[51] Int. Cl.$^5$ ..................... G11B 15/18; G11B 5/008; B65H 59/38
[52] U.S. Cl. ................................ 360/71; 360/96.3; 360/74.3; 242/189
[58] Field of Search ............. 360/71, 74.3, 137, 96.3; 242/189, 198

[56] References Cited

U.S. PATENT DOCUMENTS

| | | | |
|---|---|---|---|
| 3,883,893 | 5/1975 | Ueki et al. | 360/74.2 |
| 3,932,890 | 1/1976 | Ueki et al. | 360/96.2 |
| 3,936,877 | 2/1976 | Maruyama et al. | 360/96.3 |
| 4,067,051 | 1/1978 | Nakamura | 360/95 |
| 4,214,283 | 7/1980 | Fushimi et al. | 360/96.3 |
| 4,754,347 | 6/1988 | Kodama | 360/85 |
| 4,774,604 | 9/1988 | Hayashi et al. | 360/96.3 |
| 4,899,951 | 2/1990 | Okada et al. | 360/96.3 |

*Primary Examiner*—A. J. Heinz
*Assistant Examiner*—Jefferson Evans

[57] ABSTRACT

In a tape recorder, a tape tensioning device for tensioning the tape in a tape cassette comprises a movable member for causing a tension detection switch to open when the movable member is moved in a first direction, and a gear mechanism composed of first and second gears and a tensioning gear meshable with the first and second gears upon movement of the member in a second direction, to rotate one reel spindle. The tensioning gear is movable about the first gear upon inhibition of rotation of the spindle. The device further includes a brake for inhibiting rotation of the other spindle, and a retaining mechanism responsive to movement of the gear for further moving the member in the first direction to retain the member in such a position that the gear is moved away from the first and/or second gears, to release the other spindle from the brake mechanism and to return the member to the second direction upon unloading of a tape cassette.

6 Claims, 7 Drawing Sheets

TAPE TENSIONING DEVICE FOR TAPE RECORDER

BACKGROUND OF THE INVENTION

1. Field of the Invention

This invention relates to a tape tensioning device for a tape recorder which operates, when a tape cassette in which a tape is slack is loaded, to automatically eliminate any slack in the tape to permit subsequent starting of a reproducing action.

2. Description of the Related Art

When a tape cassette is left unused for a considerable time interval, the magnetic tape within the cassette may unreel into a slacking fractional condition due to vibrations of the cassette from the outside and so forth. If a cassette tape in such condition is loaded into a tape recorder and used, then there is the possibility that on starting the slack tape may wind itself around a capstan or a pinch roller and the tape or the tape recorder may be damaged thereby.

Even from the fact that a large number of patent applications have been made so far as a countermeasure for the problem, it can be understood how seriously people having ordinary skill in the art have tackled the problem. However, the prior art devices either try to improve a mechanism around a pinch roller or a capstan so as to prevent a slack tape from entering between the pinch roller and the capstan or try to detect it without a moment's delay that a tape has wound itself around a pinch roller or a capstan.

The former has a drawback that it cannot prevent a tape from entering between a pinch roller and a capstan with certainty, while the latter only notifies the fact that a tape has wound itself around a pinch roller of a capstan and does not produce a fundamental countermeasure. Further, since neither of them tensions a tape, it is cumbersome that, when there is tape slack or when a tape winds itself around a pinch roller or a capstan, the tape recorder must be stopped by hand promptly to cope with the situation.

Furthermore, Japanese Utility Model Publication No. 1-27135 discloses the concept that when a tape slack eliminating action is made, only braking of the tape take-up side is released while the reel spindle of the tape supply side remains braked.

However, with this prior art device, an additional operating action called "tape slack eliminating action" is needed to tension the slack tape, which is laborious and time-consuming.

SUMMARY OF THE INVENTION

It is therefore an object of this invention to provide a tape tensioning device, for a tape recorder, in which when a tape cassette is only loaded, any tape slack can be automatically eliminated, without any additional operating action, to permit subsequent starting of a reproducing action.

According to a first aspect of this invention, there is provided a tape tensioning device for a tape recorder having a pair of reel spindles, a motor switch closable when an operation mode is selected with a tape cassette loaded on the reel spindles, a cassette detection switch arranged in series with the motor switch and closable in response to the loading of the tape cassette on the reel spindles, and a tape driving motor connected to a power source via the motor switch and the cassette detection switch, the motor being operatively connected to a specified one of the reel spindles for rotation to assume a predetermined operation mode, the device comprising: a tape tension detection switch of a normally closed type connected in parallel with the motor switch; a movable member for rendering the tape tension detection switch to open when the movable member is moved in one direction; a gear mechanism including first and second gears radially spaced from each other, and a tape tensioning gear supported on the movable member and meshable with the first and second gears, when the movable member has been moved in the other direction to a predetermined position, to transmit rotation of the motor to the specified one reel spindle, the tape tensioning gear being movable about the first gear by the rotating force of the motor when the rotation of the specified one reel spindle is inhibited; a brake mechanism for inhibiting the rotation of the other reel spindle; and a retaining mechanism for further moving the movable member in the one direction when the movable member is moved in the one direction in response to the movement of the tape tensioning gear, for retaining the movable member in such a position that the tape tensioning gear is moved away from at least one of the first and second gears, for releasing the other reel spindle from the brake mechanism and for returning the movable member to the other direction when the tape cassette is unloaded from the reel spindles.

According to a second aspect of the invention, the tape tensioning device further comprises: a reciprocating member movable forwardly when the tape recorder is shifted from an inoperative position to the operation mode; and a locking mechanism for inhibiting the forward movement of the reciprocating member, but when the movable member is moved in the one direction, said locking mechanism releasing the inhibition of the forward movement of the reciprocating member responsive to the movement of the movable member.

According to a third aspect of the invention, the reciprocating member is a head mounting plate.

According a fourth aspect of the invention, the retaining mechanism is provided on the reciprocating member for moving the movable member in the one direction when the reciprocating member is moved forwardly.

According to a fifth aspect of the invention, the tape tensioning device further comprises an inhibiting mechanism cooperative with the movable member for inhibiting the selection of the operation mode, the inhibiting mechanism being operable, when the movable member is moved to the one direction, so as to allow the selection of the operation mode, the inhibiting mechanism being movable, when the movable member is moved in the other direction, to such a position as to inhibit the selection of the operation mode.

With the first arrangement, when a tape cassette is loaded, the cassette detection switch is closed to render the tape driving motor to rotate. At that time if there is any slack in the tape within the cassette, the rotating force of the motor is transmitted to one reel spindle via the rotation transmitting gear, with the other reel spindle braked.

Thus when the tape slack is thus eliminated and when the rotation of one reel spindle is inhibited, the tape tensioning gear is revolved, under rotating force of the motor, to move the movable member in one direction, thereby opening the tape tension detection switch to stop the motor. Further, in response to the movement of the movable member in one direction, the retaining mechanism causes the movable member to further move in the same direction, thereby bringing the tape tensioning gear away from at least one of the first and second gear and, at the same time, bringing the brake mechanism away from the other reel spindle. It has thus been made ready for a subsequent operation mode selection.

When the cassette is unloaded, the retaining mechanism releases the movable member so that the tape tensioning device assumes its initial condition ready for loading of the next tape cassette.

With the second arrangement, when a tape cassette is loaded, the cassette detection switch is closed to render the tape driving motor to rotate. At that time if there is any slack in the tape within the cassette, the rotating force of the motor is transmitted to one reel spindle via the rotation transmitting gear, with the other reel spindle braked.

Thus, when the tape slack is thus eliminated and when the rotation of one reel spindle is inhibited, the tape tensioning gear is revolved, under rotating force of the motor, to move the movable member in one direction, thereby opening the tape tension detection switch to stop the motor. Further, in response to the movement of the movable member in one direction, the locking mechanism releases the reciprocating member from moving forwardly. And the retaining mechanism causes the movable member to further move in the same direction, thereby bringing the tape tensioning gear away from at least one of the first and second gear and, at the same time, bringing the brake mechanism away from the other reel spindle. It has thus been made ready for a subsequent operation mode selection.

When the cassette is unloaded, the retaining mechanism releases the movable member so that the tape tensioning device assumes its initial condition ready for loading of the next tape cassette.

With the third arrangement, since the reciprocating member is a head mounting plate, the forward movement of the head mounting plate is inhibited, namely, recording or reproducing is inhibited, unless the tape slack is completely eliminated.

With the fourth arrangement, in which the reciprocating member is provided with the retaining mechanism, when the reciprocating member is moved forwardly in response to the movement of the movable member in one direction as the tape slack is eliminated, the retaining mechanism causes the movable member to further move in the same direction, thus bringing the tape tensioning gear away from at least one of the first and second gears.

With the fifth arrangement, the inhibiting mechanism inhibits the selection of an operation mode, such as reproducing, recording, etc., unless the tape slack is completely eliminated.

The above and other advantages, features and additional objects of this invention will be manifest to those versed in the art upon making reference to the following detailed description and the accompanying drawings in which a certain preferred structural embodiment incorporating the principles of this invention are shown by way of illustrative example.

DETAILED DESCRIPTION

Figure 1:
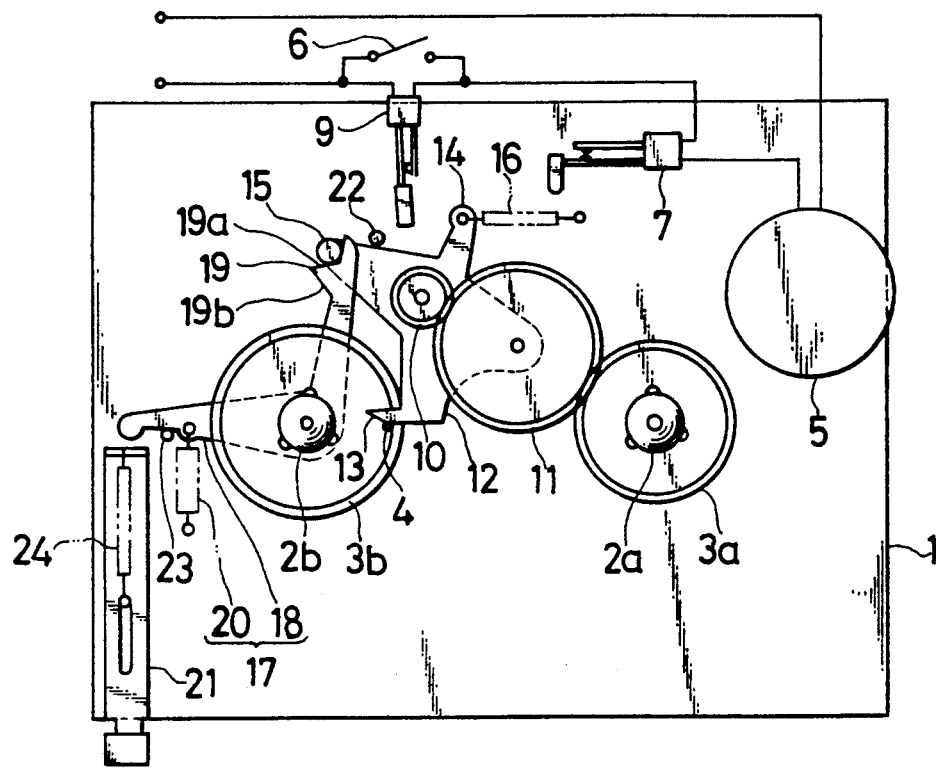
FIGS. 1 through 4 are plan views of a tape tensioning device according to a first embodiment of this invention, showing the mode of operation.

The principles of this invention are particularly useful when embodied in a tape tensioning device (hereinafter also called "device") for a tape recorder.

FIGS. 1 through 4 show a first embodiment of the device. A pair of horizontally spaced reel spindles 2a, 2b is mounted on a base 1 of the tape recorder, and a reel gear 3a, 3b is attached to a lower portion of each of the reel spindles 2a, 2b. A stop pin 4 is mounted on an upper surface of the left reel gear 3b.

Reference numeral 5 designates a tape driving motor which is connected to a power source via a motor switch 6 and a cassette detection switch 7 of normally closed type in series with the motor switch 6.

Figure 2:
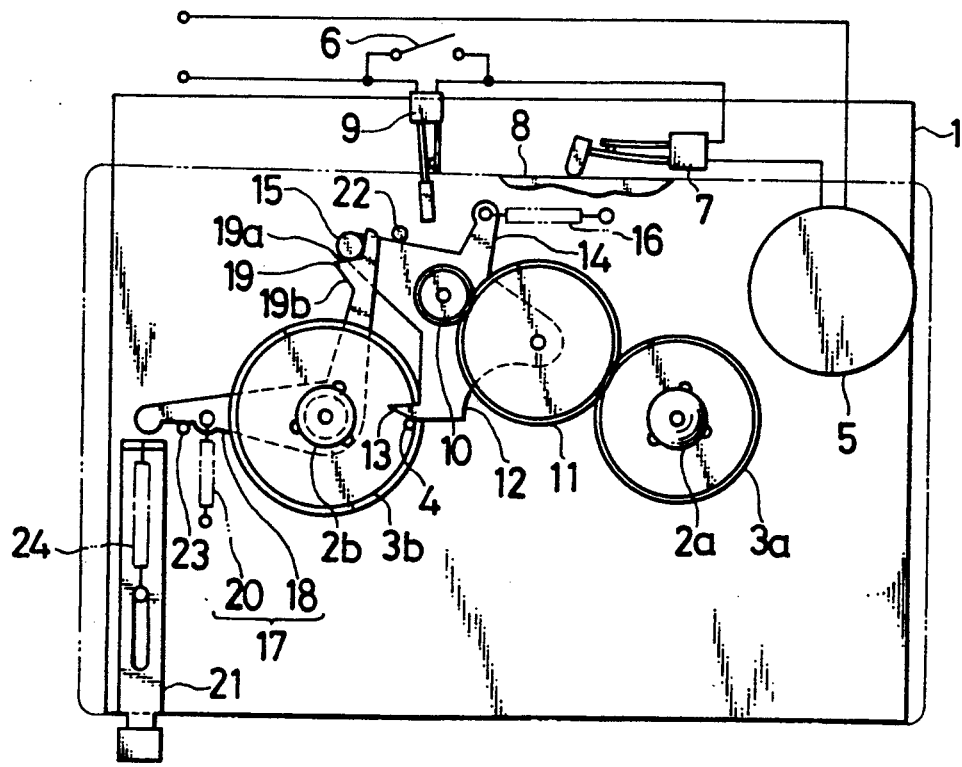
Figure 3:
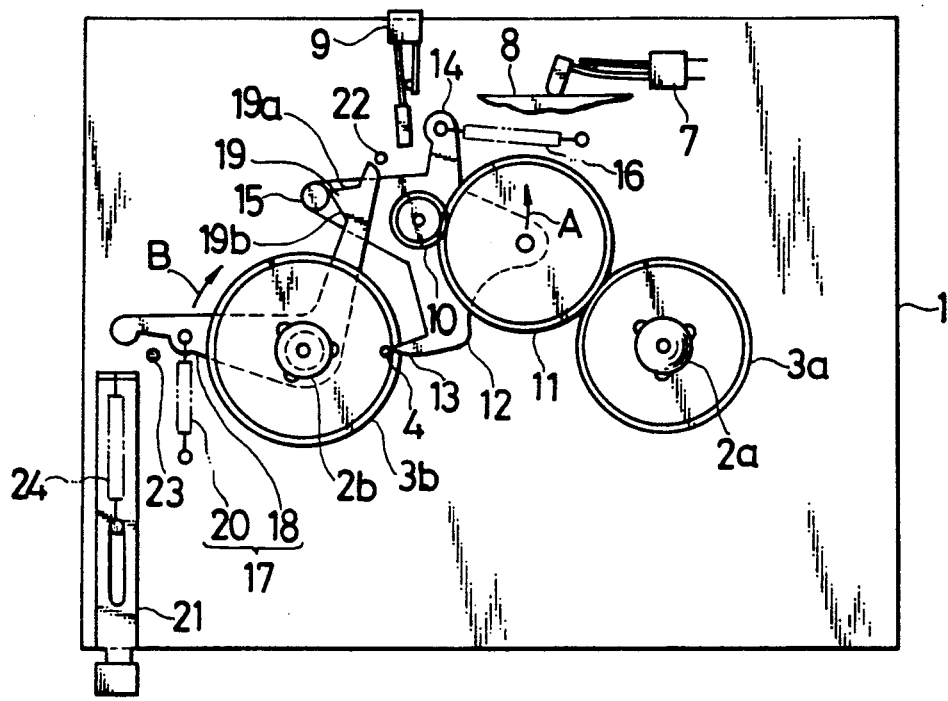

The cassette detection switch 7 is supported on the base 1 and is closable when pushed by the rear surface of the tape cassette 8 loaded on the reel spindles 2a, 2b, as shown in FIG. 2. In parallel to the motor switch 6, a tape tension detection switch 9 of normally closed type is connected to the motor switch 6.

The rotation of the motor is transmitted to a drive gear 10 mounted on the base 1, and further to the specified the reel gear 3a via the tape tensioning gear 11. The tape tensioning gear 11 is supported by the movable member 12 pivotally supported on an axis together with the gear 10, and is meshable with the reel gear 3a when the movable member 12 moves clockwise as shown in FIG. 2.

The movable member 12 includes a brake mechanism 13, a switch operating member 14 and an engaging pin 15, and is always urged to move clockwise by a spring 16. When the movable member 12 is moved clockwise, it causes the brake mechanism 13 to engage with the stop pin 4, and inhibits the other reel spindle 2b from rotating. When the movable member 12 moves counterclockwise, it releases the tape tensioning switch 9 by the operation of the switch operating member 14.

Reference numeral 17 designates a retaining mechanism, which comprises a nearly L-shaped movable lever 18 having a triangular projection 19 on its one end and being urged to be rotatable in one direction by a spring 20. When the movable member 12 moves counterclockwise, the movable lever 18 first moves clockwise as an edge 19a of the projection 19 is pushed by the engaging pin 15. Then, the movable lever 18 returns counterclockwise pushing the engaging pin 15 with its other edge 19b, causing the movable member 12 to move counterclockwise to a large extent, and keeping the tape tensioning gear 11 at a position disengaged from the reel gear 3a. The movable lever 18 is moved clockwise by the forward movement of an ejection operating member 21, and releases the movable member 12 from the locked condition.

Reference numerals 22 and 23 designate respectively stops for controlling the movement in the urged direction of the movable member 12 and the movable lever 18, and 24 a spring for releasing the eject operating member 21.

Operation of the device according to this embodiment will be described below.

FIG. 1 shows a tape recorder in which a tape cassette 8 is not loaded. When the tape cassette 8 is loaded onto the pair of the reel spindles 2a, 2b, the cassette detection switch 7 is closed, and the tape driving motor 5 is started. The rotation of the motor 5 is transmitted to the reel spindle 2a via the gear 10, the tape tensioning gear 11 and the reel gear 3a, so that the tape in the cassette 8 is taken up by such a length to eliminate the slack while the reel spindle 2b is locked by the brake mechanism 13.

Once the slack in the tape within the cassette 8 has thus been eliminated, the rotation of the reel spindle 2a is inhibited, and the rotation of the gear 10 cause the tape tensioning gear 11 to be moved in the direction shown by an arrow A so as to be out of meshing engagement with the reel gear 3a. Consequently the movable member 12 is moved counterclockwise. Then the engaging pin 15 pushes the edge 19a of the triangular projection 19, permitting the movable lever 18 to move in the direction shown by an arrow B. When the engaging pin 15 passes over the peak of the projection 19, the movable lever 18 is returned to its original position by a spring 20, causing the edge 19b of the projection 19 to push the engaging pin 15 and to move the movable member 12 in the direction A to a large extent. Consequently the switch operating member 14 releases the tape tension detection switch 9, thereby inhibiting the rotation of the motor 5. Following the movement of the movable member 12 in the direction A, the tape tensioning gear 11 is disengaged from the reel gear 3a, and the brake mechanism 13 is out of the meshing engagement with the stop pin 4, which releases the braking of the reel spindle 2b. When selecting the operation mode such as the reproduction or recording action under the condition as illustrated in FIG. 4, the motor switch 6 is closed as shown by a phantom line to restart the motor 6 for the desired operation mode.

Figure 4:
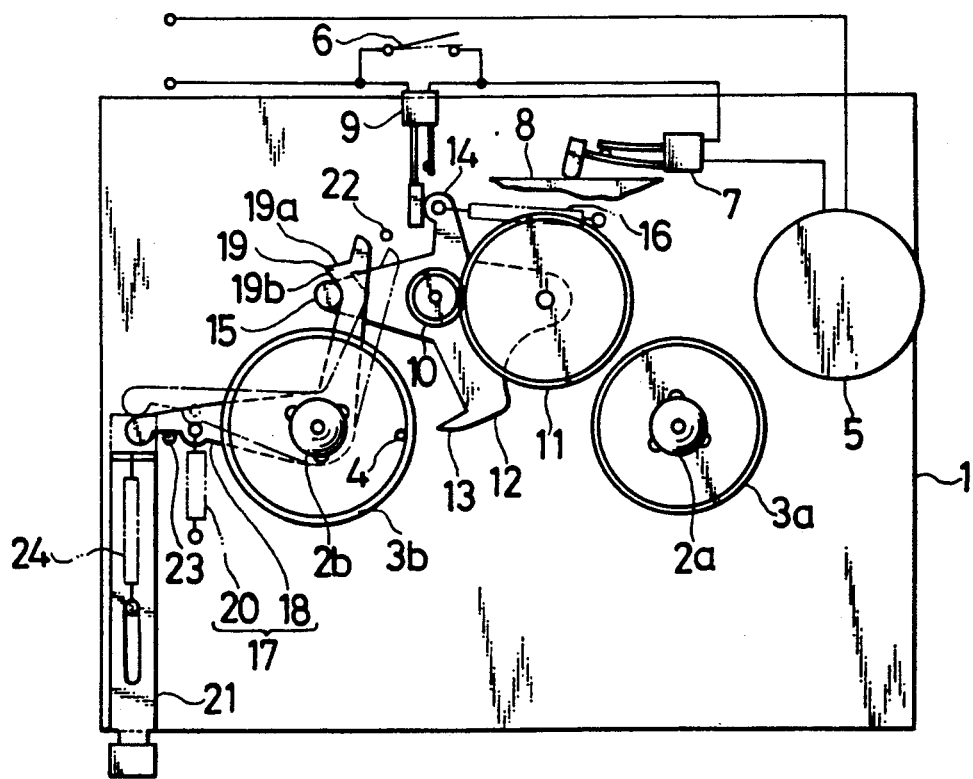

When the tape cassette 8 is unloaded, the ejection operating member 21 moves forward, as shown by a phantom line in FIG. 4, to unload the tape cassette 8 from both of the reel spindles 2a, 2b, and pushes the movable lever 18 to move it clockwise. Then the engaging pin 15 is released from the triangular projection 19, the movable member 12 is returned clockwise by the spring 16, and the tape tensioning gear 11 meshes with the reel gear 3a. When the ejection operating member 21 returns to its original position, the tape recorder assumes its initial condition ready for loading of the next tape cassette.

In the described embodiment, the movable member 12 is returned to its original position by the forward movement of the ejection operating member 21. Alternatively, it is possible to return the movable member 21 by disposing a member which is differently positioned depending upon the presence or absence of the tape cassette. The movable member 12 is not always required to be pivotally movable, but may be linearly reciprocative. The retaining mechanism may be composed of a reversing spring disposed between the base 1 of the tape recorder and the movable member 12. In such a case, the reversing spring may reverse after it passes over the dead point, so that the movable member 12 is moved to a further extent before the tape tensioning gear 11 is out of meshing engagement with the reel gear 3a.

In the above embodiment, the brake mechanism 13 and the switch operating member 14 are disposed at a part of the movable member 12. Alternatively, these members can be disposed at a member other than the movable member 12.

In addition, the brake mechanism can be formed so as to be meshable with teeth of the reel gear 3b and inhibit the rotation of the reel spindle 2b.

The second and third aspects of this invention will be described with reference to FIGS. 5 to 7.

The cooperative relationship between the reel spindles 2a, 2b, the reel gears 3a, 3b, the tape driving motor 5, the motor switch 6, the cassette detection switch 7, the tape cassette 8 and the tape tensioning switch 9 is identical with that in the first embodiment illustrated in FIGS. 1 to 4.

The rotation of the motor 5 is transmitted to the reel gear 3a via a tape tensioning gear 31 and an intermediate gear 32. The tape tensioning gear 31 is supported by a movable member 33 which is pivotally movable on an axis 33a. When the movable member 33 is moved counterclockwise, the tape tensioning gear 31 meshes with the motor gear 30 and the reel gear 3a. The movable member 3 is always urged to move counterclockwise by the spring 34.

A movable plate 35 which is pivotally movable on an axis 35a is connected to the movable member 33 by means of a pin 37 engageable with an elongate hole 36. To a part of the movable plate 35 are connected a brake mechanism 38, an engaging pin 39, a switch operating member 40 and a locking mechanism 41.

Reference numeral 42 designates a head mounting plate as a reciprocating member, which includes a magnetic head 43 for the recording/reproduction action on the upper surface thereof, and is vertically slidable. When operated for the recording or reproducing action, the head mounting plate 42 slides upwardly to have the magnetic head 43 come into contact with the tape in the cassette 8.

Reference numeral 44 designates a slidable plate which is horizontally slidable and is always urged to slide clockwise by a spring 45. The slidable plate 44 is formed with a stepped portion 46 engageable with the pin 39, and a retaining mechanism 49 comprising a sloping surface 47 and a parallel surface 48 which are contiguous to the stepped portion 46. The slidable plate 44 also has a pressure receiving pin 50 formed on its upper surface. The base 1 is provided with an ejection operating member 51 which is vertically movable when unloading the tape cassette. The ejection operating member 51 has a sloping surface 52 for the pressure receiving pin 50 at its one end, and is always urged to move vertically movable by a return spring 53.

The following description will clarify the cooperative relationship between the movable member 33, the movable plate 35, the reel gear 3b, the tape tensioning switch 9, the head mounting plate 42, the slidable plate 44 and the ejection operating member 51.

Figure 5:
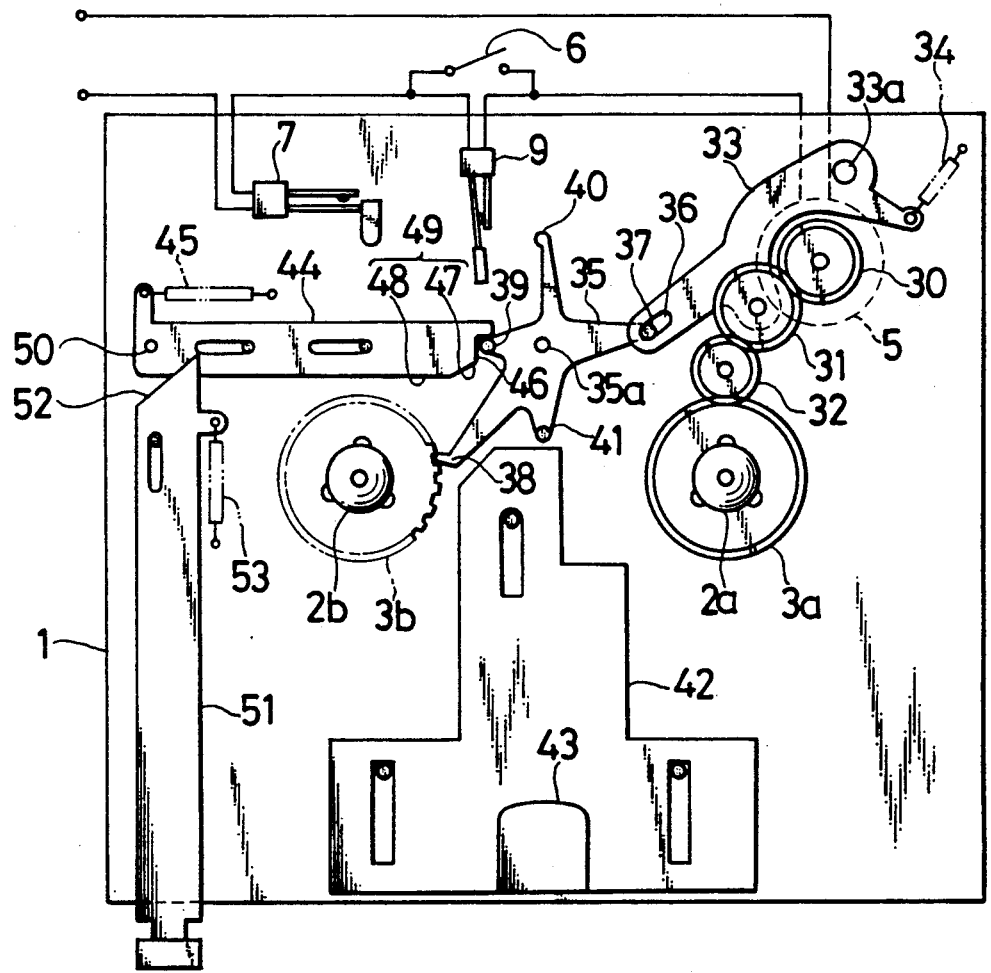
FIGS. 5 through 7 are plan views of a modified tape tensioning device according to a second embodiment, showing the mode of operation.

FIG. 5 shows the tape recorder before the tape cassette 8 is loaded therein. The movable member 33 is at a counterclockwise position, the brake mechanism 38 is engaged with the reel gear 3b so as to inhibit the rotation of the reel spindle 2b, the engaging pin 39 remains engaged with the stepped portion 46 to inhibit the rightward movement of the slidable plate 44, and the locking mechanism 41 is positioned so as to prevent the head mounting plate 42 from moving toward the reproducing position.

Figure 6:
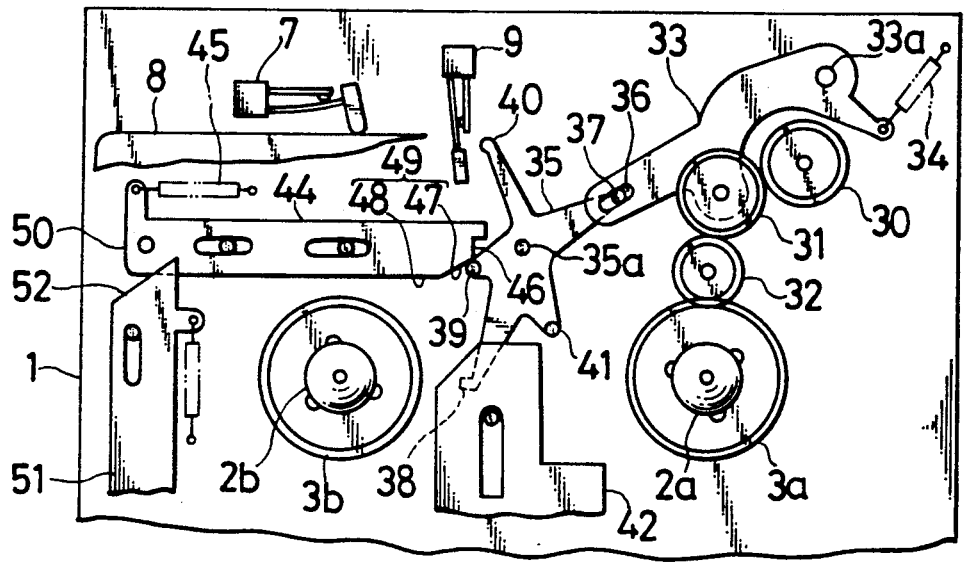

When the tape cassette 8 is loaded onto the reel spindles 2a, 2b under this condition, the cassette detecting switch 7 is closed as shown in FIG. 6, and the tape driving motor 5 is started. The rotation of the tape driving motor 5 is transmitted to the reel spindle 2a via the motor gear 30, the tape tensioning gear 31 and the reel gear 3a so that the tape in the cassette is taken up by such a length as to eliminate the tape slack.

Once the tape slack has been thus eliminated, the reel spindle 2a is inhibited from rotation due to the tension of the tape. Consequently the tape tensioning gear 31 moves to be out of meshable engagement with the intermediate gear 32 due to the rotation of the motor gear 30. The tape tensioning gear 31 causes the movable member 33 to move slightly clockwise against the bias of the spring 34 as illustrated in FIG. 6.

In synchronization with the clockwise movement of the movable member 33, the movable plate 35 pivotally moves counterclockwise, causing the engaging pin 39 to be disengaged from the stepped portion 46 as shown in FIG. 6. The slidable plate 44 is made to slide rightward by the spring 45. The sloping surface 47 pushes the engaging pin 39 to make the movable plate 35 pivotally move further counterclockwise. As shown in FIG. 7, a parallel surface 48 receives the engaging pin 39, retaining the movable plate 35 at a predetermined position. At this time, the movable member 33 pivotally moves counterclockwise to a large extent, and disengages the tape tensioning gear 31 from the adjacent gears (namely, the motor gear 30 and the intermediate gear 32). Then the switch operating member 40 releases the tape tension detection switch 9, inhibits the rotation of the motor 5, and keeps the locking mechanism 41 at a position off from the forward movement path of the head mounting plate 42. When the operation mode selection, such as the reproducing or recording action, is made the head mounting plate 42 is urged to move forward, the magnetic head 43 comes into contact with the tape, the motor switch 6 closes, as shown by a phantom line, to restart the motor 5 so that the tape recorder is ready for the desired operation mode.

Figure 7:
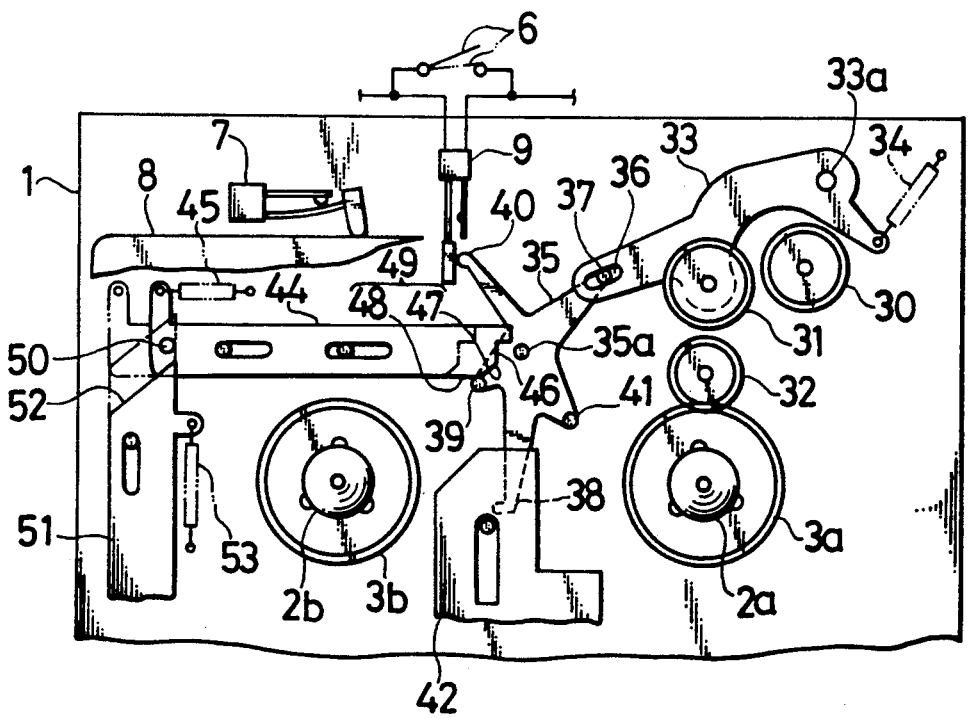

When the tape cassette is unloaded, the ejection operating member 51 is moved forward as illustrated by a phantom line in FIG. 7, the head mounting plate 42 returns to its original position, and at the same time the cassette 8 is unloaded from the reel spindles 2a, 2b. Then the sloping surface 52 of the ejection operating member 51 pushes and slides the slidable plate 44 to the left, thereby returning the movable plate 35 and the movable member 33 to the original positions, respectively. Consequently the tape tensioning devices assumes its initial condition ready for loading of the next cassette tape, as shown in FIG. 5.

The second and third aspects of this invention are not limited to the embodiment described above. Alternatively, the movable member may be linearly reciprocative. The retaining mechanism may be composed of a reversing spring in the embodiment related to the first aspect of this invention (illustrated in FIGS. 1 to 4). Further, the brake mechanism, the locking mechanism and the switch operating member can be formed at a part of the movable member.

Figure 8:
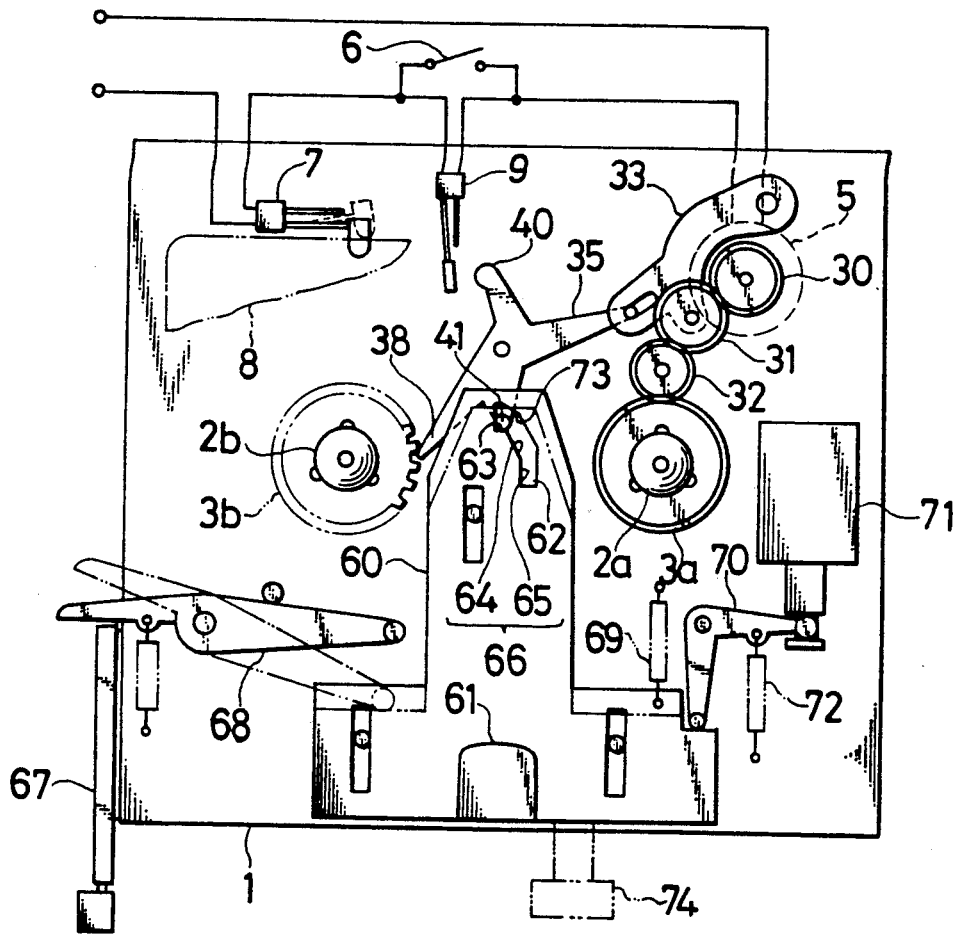
FIG. 8 is a plan view of another modified tape tensioning device according to a third embodiment.
Figure 9:
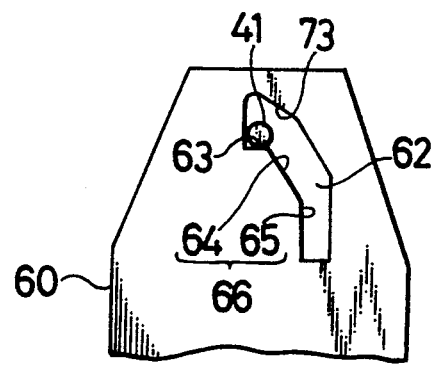
FIG. 9 is a fragmentary enlarged plan view of FIG. 8.

FIGS. 8 and 9 illustrate an embodiment according to the fourth aspect of this invention. The cooperative relationship between the following members is identical to that of the embodiment shown in FIGS. 5 to 7: a pair of the reel spindles 2a, 2b, the reel gears 3a, 3b, the tape driving motor 5, the motor switch 6, the cassette detecting switch 7, the tape cassette 8, the tape tension detecting switch 9, the motor gear 30, the tape tensioning gear 31, the intermediate rear 32, the movable member 33, the movable plate 35, the brake mechanism 38, the switching operating member 40 and the locking mechanism 41. However, neither slidable plate nor spring is provided in the movable member 33.

A head mounting plate 60 as a reciprocating member includes a magnetic head 61 for the recording/reproducing action on its upper surface, and a cam groove 62 at a part thereof.

As shown in FIG. 9, the cam groove 62 is formed with a stepping portion 63 corresponding to the locking mechanism 41, and a retaining mechanism 66 having a sloping surface 63 and a vertical surface 65 contiguous to the stepping portion 63. At its one end, the cam groove 62 has a sloping surface 73 for urging the return movement of the movable member.

On one edge of the base 1, an ejection operating member 67 is mounted for reciprocating movement. The upward movement of the ejection operating member 67 causes a lever 68 to push the head mounting plate 60 to the stop position back from the reproducing position. The head mounting plate 60 is always urged toward the reproducing position by the spring 69. An L-shaped lever 70 keeps the head mounting plate 60 at the reproducing position. The L-shaped lever 70 is operated by an electromagnetic plunger 71 which is conducted by the mode selection operation such as the reproduction and recording action. When operated by the plunger 71, the L-shaped lever 70 frees the head mounting plate 60 from the locked position. Reference numeral 72 designates a spring for releasing the L-shaped lever 70.

When the tape cassette 8 is loaded onto the reel spindles 2a, 2b under the condition shown in FIG. 8, the cassette detection switch 7 closes first, the tape driving motor 5 is started, and the reel spindle 2a rotates to take up the tape so as to eliminate the slack.

Once the slack in the tape within the cassette has thus been eliminated, the rotation of the reel spindle 2a is inhibited, but the tape tensioning gear 31 is rotated by the rotating force of the motor gear 30, meshing with the intermediate gear 32, and moving the movable member 33 clockwise.

Then the movable plate 35 is moved counterclockwise. As soon as the locking mechanism 41 is disengaged from the stepped portion 63, the switch operating member 40 opens the tape tension detection switch 9 to inhibit the rotation of the motor 5. When the mode selection for the reproducing or recording action is performed under this condition, the electromagnetic plunger 71 operates to release the L-shaped lever 70 from the head mounting plate 60, which then moves forward to have the magnetic head 61 come into contact with the tape in the cassette. At the same time the sloping surface 64 formed on the head mounting plate 60 pushes the locking mechanism 41, causing the movable plate 35 to be moved counterclockwise to a large extent. The locking mechanism 41 comes into contact with the vertical surface 65, and maintains the movable plate 35 at the predetermined position. Consequently the tape tensioning gear 31 is disengaged from the motor gear 30 and the intermediate gear 32. When the operation mode is selected, the motor switch 6 is closed, and the motor 5 is restarted for the desired operation mode.

When unloading the tape cassette, the ejection operating member 67 is urged to move forward to return the head mounting plate 60 to its original position. Then the tape cassette is unloaded from the reel spindles 2a, 2b. Following an excessive forward movement of the ejection operating member 67, the sloping surface 73 (for returning the movable member and disposed at one edge of the cam groove 62) pushes the locking mechanism 41 and returns the movable plate 35 and the movable member 33 to their original positions, respectively. The L-shaped lever 70 and the eject operating member 67 return to their original positions, so that the tape tensioning device gets ready for loading of the next tape cassette.

In the foregoing embodiment, following the operation mode selection, the electromagnetic plunger 71 is operated, the L-shaped lever 70 is rotated to move the head mounting plate 60 to the reproducing position by means of the spring 69. Alternatively, the motor switch is closed by pushing a reproduction button 74 shown by a phantom line so as to move the head mounting plate 60, without providing the electromagnetic plunger 71, the L-shaped lever 70 and the spring 69. In addition, it is possible to dispose the brake mechanism, the locking mechanism and the switch operating member at a part of the movable member.

Figure 10:
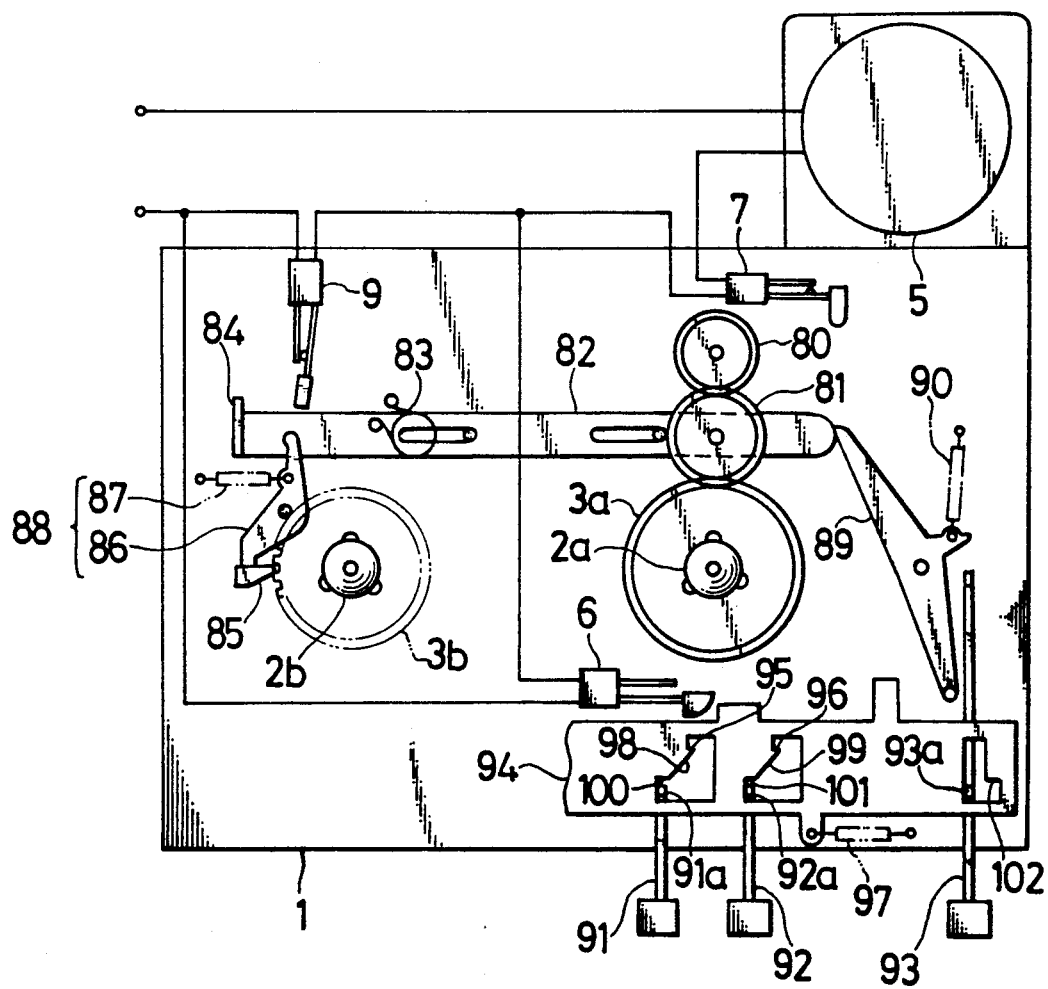
FIGS. 10 through 12 are plan views of still another modified tape tensioning device according to a fourth embodiment, showing the mode operation.

The fifth aspect of this invention will be described with reference to FIGS. 10 and 12.

The cooperative relationship between the members is identical to that of the foregoing embodiments.

The rotating force of the motor 5 is transmitted to a drive gear 80, a tape tensioning gear 81, a movable member 82, and a reel gear 3a. The drive gear 80 and the tape tensioning gear 81 are supported by the movable member 82 which is horizontally reciprocative. When the movable member 82 is moved to the left as illustrated in FIG. 10, the tape tensioning gear 81 meshes with the drive gear 80 and the reel gear 3a. The movable member 82 is moved to the left or the right, and is locked there by a spring 83 as a locking member. At its one end, the movable member 82 has a fold 84, which opens the tape tension detection switch 9 when the movable member 82 moves to the right. (Refer to FIG. 12.)

A pivotally movable brake lever 86 has an engaging portion 85 at its one end, is disposed adjacent to the reel spindle 2b, and is urged to move in one direction by a spring 87 so as to mesh the engaging portion 85 with the reel spindle 3b. The lever 86 and the spring 87 compose a brake mechanism 88. A movable lever 89 is disposed at the right side of the movable member 82, and inhibits the selection of the operation mode. The movable lever 89 is urged to move counterclockwise by a spring 90, but is caused to move clockwise when its one end is pushed by the movable member 82 moving to the right.

Reference numerals 91 and 92 designate members for the selection of the operation modes such as the reproduction and fast forwarding modes; and 93 designates an ejection operating member.

The members 91 and 92 are moved upward according to the selected operation mode, and are locked by the locking claws 95 and 96, respectively, disposed on a locking plate 94.

The locking plate 94 is always urged to move rightward by a spring 97. The locking plate 94 is formed with sloping surfaces 98, 99 and stepping portions 100, 101 contiguous to the locking claws 95, 96. The locking plate 94 also has a stepping portion 102 at its part corresponding to the ejection operating member 93. When the plate 94 is moved to the right, both of the members 91 and 92, for selecting the reproduction and fast forward modes, have their engaging projections 91a, 92b meshed with the stepping portions 100, 101, respectively, thereby inhibiting the selection of the reproduction and fast forwarding modes.

When the movable member 82 is moved rightward to move the movable lever 89, the other end of the movable lever 89 moves the locking plate 94 slightly to the left, disengaging the engaging projections 91a, 92a from the stepping portions 100, 101, respectively.

The operation of the members will be described hereinafter.

Figure 11:
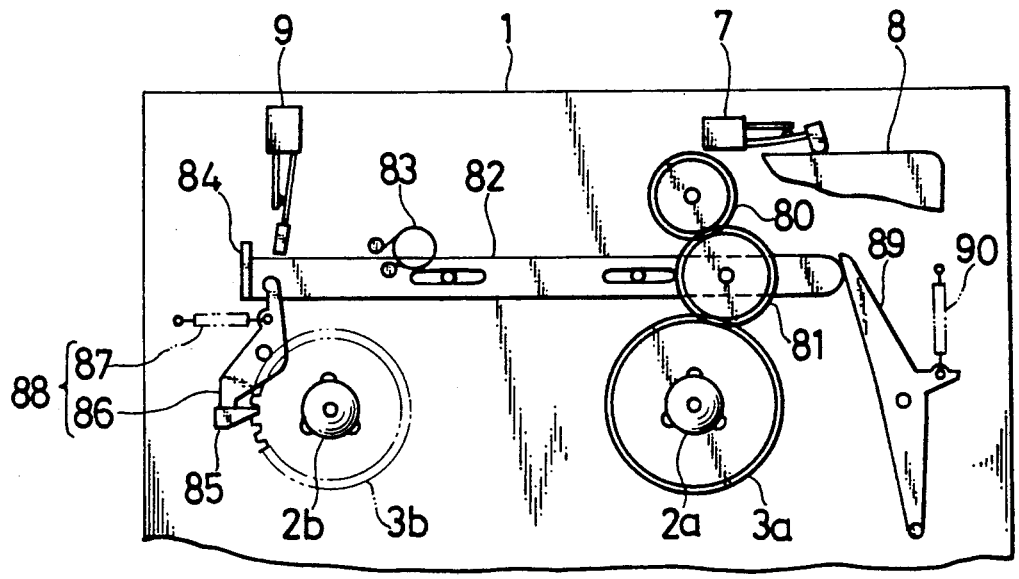

Before loading the tape cassette 8 in the device, the reel gear 3b remains braked, the cassette detection switch 7 is opened and the motor 5 is not operating. When loading the tape cassette 8 onto the reel spindles 2a, 2b as illustrated in FIG. 11, the cassette detection switch 7 is closed to render the motor 5 to rotate. The rotation of the motor 5 is transmitted to the reel spindle 2a via the gears 80, 81 and the reel gear 3a, so that the reel spindle 2a takes up the tape in the cassette and eliminates the slack in the tape.

Once the slack in the tape within the cassette has thus been eliminated, the rotation of the reel spindle 2a is inhibited due to the tension of the tape, but the rotating force of the drive gear 80 keeps the tape tensioning gear 81 rotated while meshing with the reel gear 3a, thereby moving the movable member 82 rightward.

As illustrated in FIG. 11, the reversing spring 83 reverses, and moves the movable member 82 rightward to a large extent. Consequently the tape tension detection switch 9 is opened by the fold 84 to inhibit the rotation of the motor 5. The brake mechanism 88 is disengaged from the reel gear 3b by the fold 84. The tape tensioning gear 81 is out of meshing engagement with the adjacent gears 80, 3a. The locking plate 94 is moved slightly to the left via the movable lever 89, and the mode selection operating members 91, 92 are disengaged from the stepping portions 100, 101, respectively.

Figure 12:
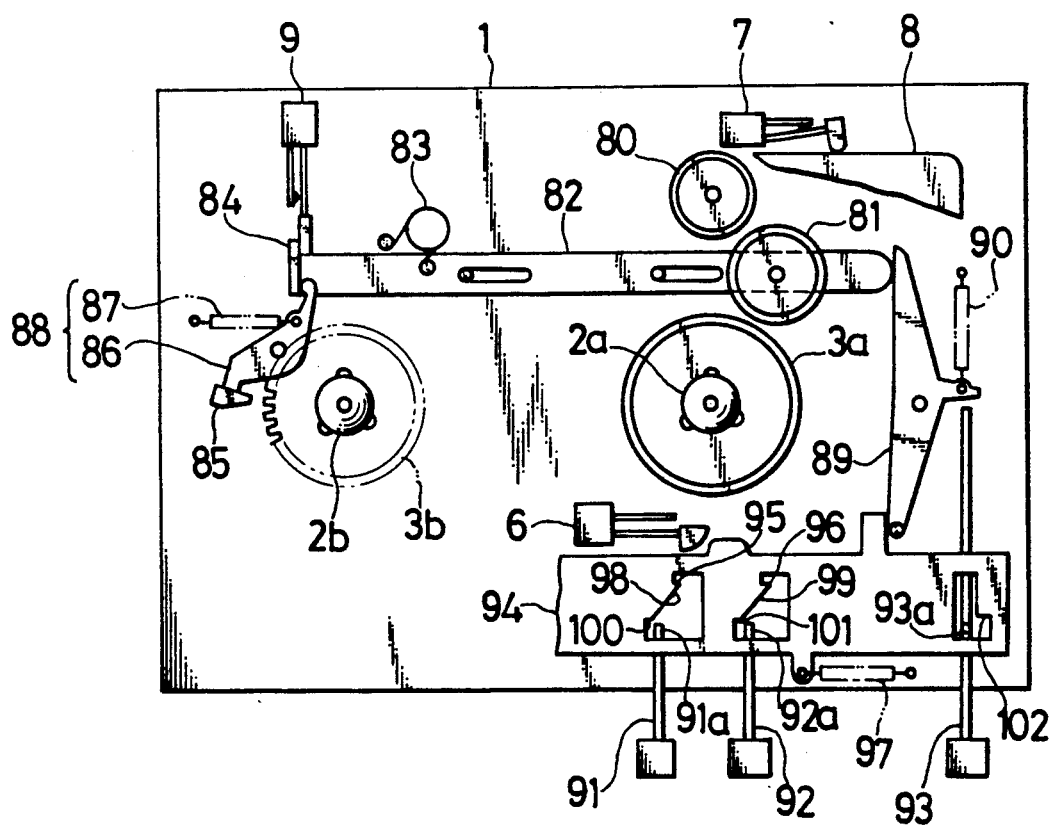

When either the reproduction or fast forwarding operation mode is selected under the condition shown in FIG. 12, the corresponding operation member 91 (or 92) is moved forward. The member 91(or 92) pushes the sloping surface 98 (or 99) by means of the engaging projection 91a (or 92a), moves the locking plate 94 further to the left until the engaging projection 91a (or 92a) is engaged with the locking claw 95 (or 96). During this while the motor switch 6 is closed by the locking plate 94, restarting the motor 5, and establishing the desired operation mode.

During the operation mode, the movement of the ejection operating member 9 is inhibited by the meshing engagement between the engaging projection 93a on the ejection operating member 9 and the stepping portion 102. When the device is to be stopped, the locking plate 94 returns to the position as shown in FIG. 12. Then the motor switch 6 is opened, inhibiting the rotation of the motor 5. When unloading the tape cassette, the ejection operating member 93 moves forward, unloading the tape cassette 8 from the reel spindles 2a, 2b. The movable member 82 is pushed back to the left by the movable lever 89, thereby returning the device to the initial condition as shown in FIG. 10, making the device ready for loading the next tape cassette.

According to the first aspect of this invention, the slack in the tape within the cassette can be automatically eliminate the tape tensioning device as soon as the tape cassette is loaded in the device.

According to the second aspect of the invention, the forward movement of the reciprocating member is inhibited by the locking mechanism until the slack in the tape is eliminated, thereby inhibiting the operation for the mode selection before the tape is properly tensioned.

According to the third aspect of the invention, the head mounting plate serves as the reciprocating member, thereby making the device very simple.

According to the fourth aspect of the invention, the retaining mechanism is formed in the reciprocating member, further simplifying the device.

According to the fifth aspect of the invention, the mechanism for inhibiting the selection and the initiation of the operation mode before the slack in the tape is eliminated.

What is claimed is:

1. A tape recorder and tape tensioning device combination comprising
    a tape recorder including:
    a pair of first and second reel spindles,
    a cassette detection switch closable responsive to loading of a tape cassette on the first and second reel spindles,
    a motor switch closable by an operation for the selection of a desired operation mode, and
    a tape driving motor connected in series to a power source via the cassette detection switch and the motor switch, whereby rotation of the tape driving motor is transmitted to one of the first and second spindles in association with the operation-mode selecting operation to set the desired operative mode; and
    a tape tensioning device including
    a normally-ON tape-slack-elimination detecting switch connected in parallel with the motor switch,
    a drive gear provided for rotation by the tape driving motor,
    a movable member provided for movement between a first position and a second position,
    a brake means movable in association with a movement of the movable member so that when the movable member is at the second position, said brake means engages a drive system for the first reel spindle to inhibit rotation of the first reel spindle but, when the movable member is at the first position, said brake means is maintained out of engagement with the drive system for the first reel spindle to permit the first reel spindle to rotate,
    a tape slack eliminating gear supported on the movable member, the tape slack elimination gear being selectively engageable in a rotation transmitting route extending between the drive gear and the second reel spindle to transmit the rotation of the drive gear to the second reel spindle, such that the tape slack eliminating gear engages with the rotation transmitting route when the movable member is at the second position and disengages from the rotation transmitting route when the movable member is at the first position,
    a holding means for further moving the movable member toward the first position when, as a result of termination of rotation of the second reel spindle, the tape slack eliminating gear has been disengaged from the rotation transmitting route and the movable member has moved toward the first position, whereby the tape slack eliminating gear is moved out of the rotation transmitting route to cut off the rotation transmitting route and also to hold the movable member at the first position,
    a switch operating portion movable responsive to a movement of the movable member so that, when the movable member is held at the first position, the switch operating portion turns off the tape-slack-elimination detecting switch, and
    a reset means for releasing said holding means in association with unloading of the tape cassette from the first and second reel spindles, thereby moving the movable member to the second position.

2. The combination according to claim 1, wherein the tape tensioning device further includes:
    a reciprocating member movable in a tape engaging direction when the mode of the tape recorder is changed from an inoperative mode to an operative mode; and
    a locking means for selectively preventing the movement of said reciprocating member in the tape engaging direction, said reciprocating member being released for movement in the tape engaging direction in response to the movement of the movement of the movable member toward the first position.

3. The combination according to claim 2, in which said reciprocating member is a head mounting plate.

4. The combination according to claim 2, in which said holding means is provided on said reciprocating member for moving said movable member toward the first position when said reciprocating member is moved in the tape engaging direction.

5. The combination according to claim 1, wherein the tape tensioning device further includes an inhibiting means operable in cooperation with said movable member for inhibiting the selection of the operation mode, said inhibiting means being operable, when the movable member is moved toward the first position, so as to allow the selection of the operation mode, said inhibiting means being movable, when the movable member is moved toward the second position, to such a position as to inhibit the selection of the operative mode.

6. The combination according to claim 1, wherein the brake means and switch operating portion are formed integrally with the movable member and the reset means is formed integrally with the switch operating portion.

* * * * *